United States Patent
Yoshida et al.

(10) Patent No.: US 8,988,029 B2
(45) Date of Patent: Mar. 24, 2015

(54) MOTOR DRIVING CONTROL DEVICE

(71) Applicant: Minebea Co., Ltd., Kitasaku-Gun, Nagano (JP)

(72) Inventors: Ken Yoshida, Fukuroi (JP); Toshihiro Tamitsuji, Iwata (JP); Hitoshi Umeda, Kakegawa (JP)

(73) Assignee: Minebea Co., Ltd., Nagano (JP)

( * ) Notice: Subject to any disclaimer, the term of this patent is extended or adjusted under 35 U.S.C. 154(b) by 167 days.

(21) Appl. No.: 13/768,638

(22) Filed: Feb. 15, 2013

(65) Prior Publication Data

US 2013/0257330 A1 Oct. 3, 2013

(30) Foreign Application Priority Data

Mar. 28, 2012 (JP) ................. 2012-073147

(51) Int. Cl.
| H02P 1/04 | (2006.01) |
| H02P 1/18 | (2006.01) |
| H02P 6/20 | (2006.01) |
| H02M 3/335 | (2006.01) |
| H02M 7/17 | (2006.01) |
| H02H 3/08 | (2006.01) |

(52) U.S. Cl.
CPC .. *H02P 1/04* (2013.01); *H02P 1/18* (2013.01); *H02P 6/20* (2013.01)
USPC ........ 318/430; 361/93.1; 363/127; 363/21.02

(58) Field of Classification Search
USPC ....................................................... 318/430
See application file for complete search history.

(56) References Cited

U.S. PATENT DOCUMENTS

| 2005/0017665 A1* | 1/2005 | Horng et al. ................. 318/434 |
| 2011/0031916 A1* | 2/2011 | Bonner et al. ........... 318/400.26 |
| 2011/0204834 A1* | 8/2011 | Imai et al. ................ 318/400.26 |

FOREIGN PATENT DOCUMENTS

| EP | 0574039 A1 * | 12/1993 |
| JP | 2001-286181 A | 10/2001 |

* cited by examiner

*Primary Examiner* — Bentsu Ro
*Assistant Examiner* — Said Bouziane
(74) *Attorney, Agent, or Firm* — Carrier Blackman & Associates, P.C.; Joseph P. Carrier; Jeffrey T. Gedeon

(57) ABSTRACT

A motor driving device comprises: an AC/DC converter that converts alternating current power into direct current power; a motor driving unit that operates based on the direct current power supplied from the AC/DC converter and outputs a driving signal to a motor; and a start-up auxiliary circuit that is arranged on a path connecting the AC/DC converter and the motor driving unit, wherein the start-up auxiliary circuit: delays an output of the driving signal for a first predetermined time period after the supply of the alternating current power from the alternating current power supply to the AC/DC converter starts; and gradually increases a driving voltage so that current flowing in a driving coil of the motor is limited to a predetermined value or smaller for a second predetermined time period after the output of the driving signal from the motor driving unit starts.

6 Claims, 4 Drawing Sheets

US 8,988,029 B2

MOTOR DRIVING CONTROL DEVICE

CROSS-REFERENCE TO RELATED APPLICATION

This application claims priority from Japanese Patent Application No. 2012-073147 filed on Mar. 28, 2012, the entire subject matter of which is incorporated herein by reference.

TECHNICAL FIELD

This disclosure relates to a motor driving control device, and more specifically, to a motor driving control device that converts alternating current power into direct current power and then feeds the same to a motor.

BACKGROUND

A driving control device has been known which is input alternating current power supplied from an alternating current power supply, converts the alternating current power into direct current power by an AC/DC converter and controls a motor driving by using the direct current power (for example, refer to JP-A-2001-286181).

JP-A-2001-286181 discloses a motor control device that removes a harmonic component included in an inductive voltage to then reduce a torque ripple of a motor.

SUMMARY

However, the motor driving control device as disclosed in JP-A-2001-286181 has following situations.

First, when the motor starts up simultaneously with the supply of the alternating current power from the alternating current power supply, an operation of the AC/DC converter becomes unstable. Specifically, it may be difficult to start up of the circuit in a low-consumption power supply adapted to a rating of a motor.

That is, when a load is directly connected to the AC/DC converter, start-up current and load current flow in the AC/DC converter at the same time. Therefore, the start-up of the AC/DC converter is apt to unstable. At a state where the start-up of the AC/DC converter is unstable, the power supply to the load is difficult. Accordingly, it is necessary to separate off the load from the AC/DC converter in the start-up, for example, until the AC/DC converter becomes sufficiently stable.

Second, in the starting of the motor, the rated current or larger flows in the motor. Due to this, an operation of the AC/DC converter may be unstable in the starting of the motor. When an AC/DC converter having a sufficiently marginal power capacity is used, the situation may be not caused. However, when over-current occurs in the starting in a circuit having little margin, a protection-operation is performed. That is, the AC/DC converter may stop or an intermittent mode operation may be performed.

In view of the above, this disclosure provides at least a motor driving control device having a simple circuit configuration and an AC/DC converter capable of stably operating in a start-up of a motor.

A motor driving device of this disclosure comprises: an AC/DC converter that converts alternating current power, which is supplied from an alternating current power supply, into direct current power; a motor driving unit that operates based on the direct current power supplied from the AC/DC converter and outputs a driving signal to a motor; and a start-up auxiliary circuit that is arranged on a path connecting the AC/DC converter and the motor driving unit. The start-up auxiliary circuit: delays an output of the driving signal from the motor driving unit for a first predetermined time period after the supply of the alternating current power from the alternating current power supply to the AC/DC converter starts; and gradually increases a driving voltage of the motor driving unit so that current flowing in a driving coil of the motor is limited to a predetermined value or smaller for a second predetermined time period after the output of the driving signal from the motor driving unit starts.

In the above-described motor driving control device, the start-up auxiliary circuit may comprise: a start-up delay circuit that delays the output of the driving signal from the motor driving unit for the first predetermined time period; and a current limiting circuit that limits the current flowing in the driving coil of the motor for the second predetermined time period. The start-up delay circuit may comprise: a delay time setting circuit that sets the first predetermined time period; and a switch circuit that sets the direct current power to be supplied from the AC/DC converter to the motor driving unit after the first predetermined time period set by the delay time setting circuit elapses. The current limiting circuit may comprise: a current detection circuit that detects a current value of the direct current power; and an over-current feedback circuit that controls an operation of the switch circuit in response to the current value detected by the current detection circuit.

In the above-described motor driving control device, the start-up delay circuit may comprise at least one of: a reset circuit that discharges electric energy accumulated in the delay time setting circuit; and a damper circuit that limits current flowing in the switch circuit.

In the above-described motor driving control device, the current limiting circuit may comprise a voltage level adjusting circuit that adjusts a voltage level of a direct current voltage to be supplied to the over-current feedback circuit, in response to a current value of the direct current power.

In the above-described motor driving control device, in a restart-up after a rotor of the motor is locked, the start-up auxiliary circuit may gradually increases the driving voltage of the motor driving unit so that the current flowing in the driving coil of the motor is limited to a predetermined value or smaller for a third predetermined time period after the output of the driving signal from the motor driving unit starts until the motor reaches a steady rotation.

In the above-described motor driving control device, the second predetermined time period may be a time period after the output of the driving signal from the motor driving unit starts until the motor reaches a steady rotation.

Meanwhile, in another aspect of this disclosure, a start-up auxiliary circuit comprises: a start-up delay circuit that delays an output of a received driving signal for a first predetermined time period; and a current limiting circuit that limits a current to be supplied to a drive target for a second predetermined time period, wherein the start-up delay circuit comprises: a delay time setting circuit that sets the first predetermined time period; and a switch circuit that sets a direct current power to be supplied to the drive target after the first predetermined time period set by the delay time setting circuit elapses. The current limiting circuit comprises: a current detection circuit that detects a current value of the direct current power; and an over-current feedback circuit that controls an operation of the switch circuit in response to the current value detected by the current detection circuit.

According to this disclosure, the start-up auxiliary circuit delays the output of the driving signal from the motor driving unit for a predetermined time period after the supply of the alternating current power to the AC/DC converter starts, and limits the current flowing in the driving coil of the motor for a predetermined time period after the output of the driving signal starts. Therefore, it is possible to provide the motor driving control device having a simple circuit configuration and the AC/DC converter capable of stably operating in the start-up of the motor.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, a motor driving control device according to one illustrative embodiment of this disclosure will be described.

Illustrative Embodiment

Figure 1:
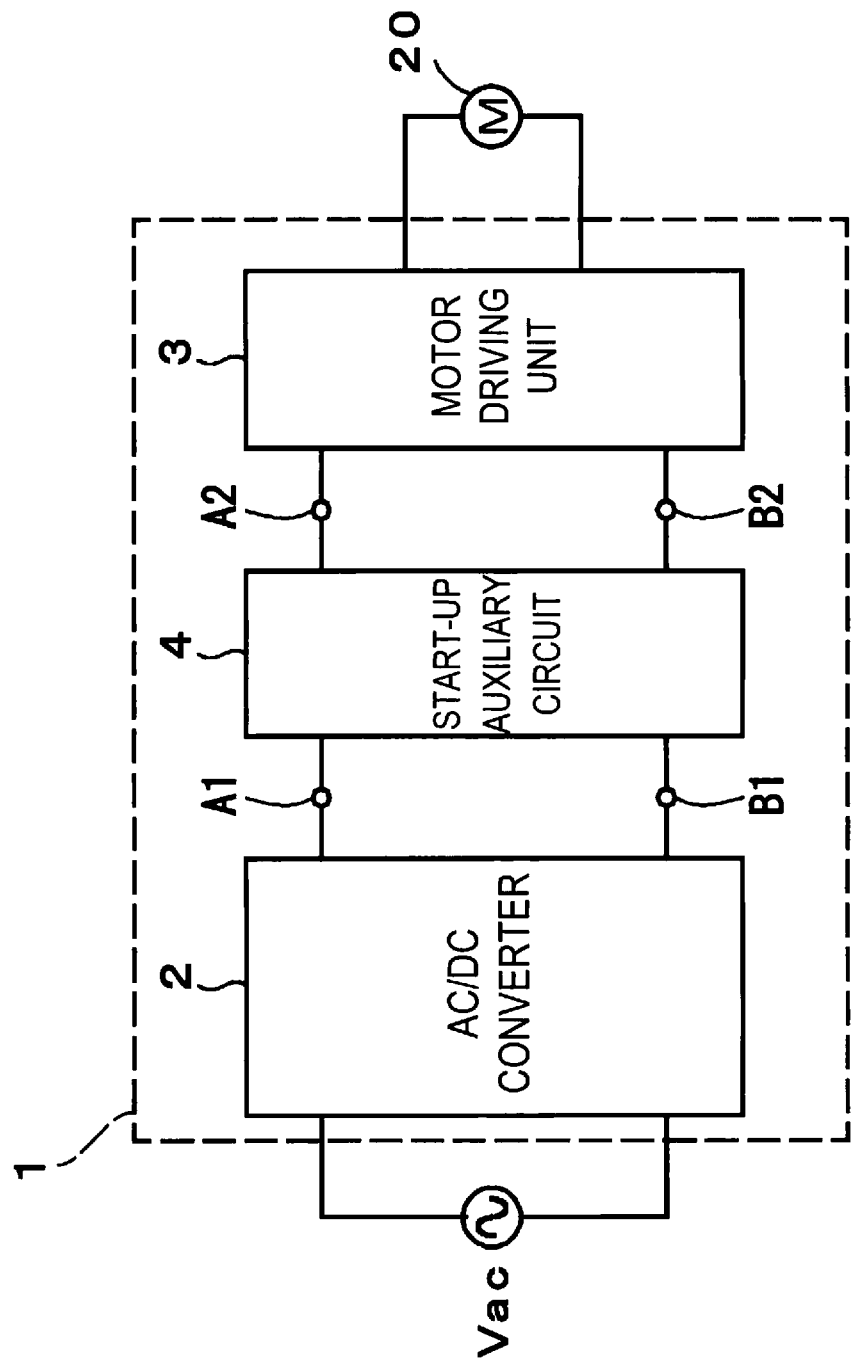
FIG. 1 is a block diagram schematically illustrating a circuit configuration of a motor driving control device according to an illustrative embodiment of this disclosure.

FIG. 1 is a block diagram schematically illustrating a circuit configuration of a motor driving control device 1 according to one illustrative embodiment of this disclosure.

[Schematic Configuration of Motor Driving Control Device]

As shown in FIG. 1, a motor driving control device (hereinafter, which may be also simply referred to as a driving control device) 1 has an AC/DC converter 2, a motor driving unit 3 and a start-up auxiliary circuit 4. The AC/DC converter 2 is connected to an alternating current power supply Vac. The driving control device 1 feeds power to a motor 20, based on the alternating current power supply Vac, thereby driving the motor 20. The motor 20 is a DC brushless motor, for example.

The AC/DC converter 2 converts alternating current power, which is supplied from the alternating current power supply Vac, into direct current power.

The motor driving unit 3 operates based on the direct current power that is supplied from the AC/DC converter 2. In this illustrative embodiment, the motor driving unit 3 outputs a driving signal to the motor 20, thereby driving the motor 20. The motor driving unit 3 has a general configuration for driving the motor 20. That is, the motor driving unit 3 includes a PWM signal generation circuit and an inverter circuit.

The start-up auxiliary circuit 4 is connected to the motor driving unit 3. In this illustrative embodiment, the start-up auxiliary circuit 4 is arranged on a path connecting the AC/DC converter 2 and the motor driving unit 3. That is, as shown in FIG. 1, the start-up auxiliary circuit 4 is connected to two lines of an output side of the AC/DC converter 2 at points A1, B1. Also, the start-up auxiliary circuit 4 is connected to two lines of an input side of the motor driving unit 3 at points A2, B2. A line on which the points A1, A2 are positioned is a high pressure-side line and a line on which the points B1, B2 are positioned is a low pressure-side line (for example, GND-side line).

The start-up auxiliary circuit 4 performs a delay operation for the motor driving unit 3 and a current limiting operation of driving current flowing in the motor 20. The delay operation is performed for a predetermined delay time period (first predetermined time period) after the supply of the alternating current power from the alternating current power supply Vac to the AC/DC converter 2 starts. In the delay operation, the start-up auxiliary circuit 4 delays an output of the driving power from the motor driving unit 3. In the meantime, the current limiting operation is performed for a predetermined start-up time period (second predetermined time period) after the output of the driving power starts until the motor 20 reaches a steady rotation. In the current limiting operation, the start-up auxiliary circuit 4 gradually increases a driving voltage of the motor driving unit 3 so that current flowing in a driving coil of the motor 20 is limited to a predetermined value or smaller. The delay operation and the current limiting operation will be specifically described later.

Figure 2:
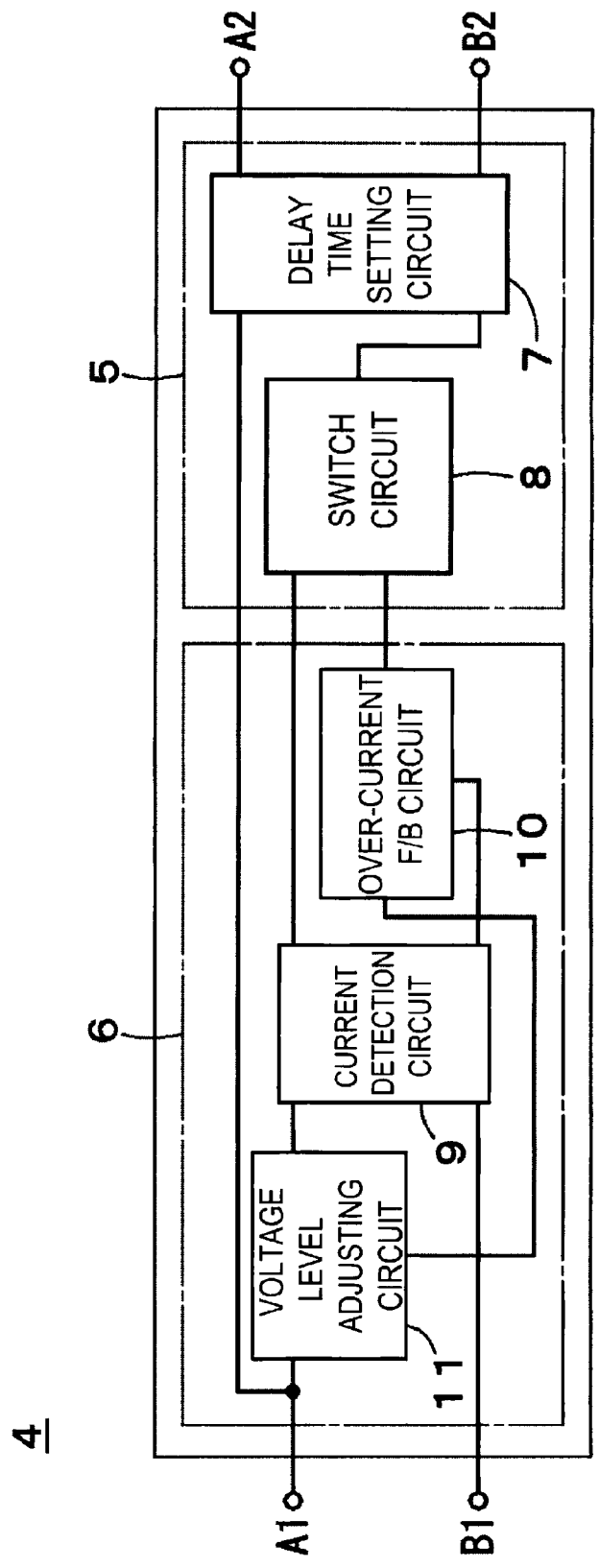
FIG. 2 is a block diagram illustrating a circuit configuration of a start-up auxiliary circuit of the motor driving control device.

FIG. 2 is a block diagram illustrating a circuit configuration of the start-up auxiliary circuit 4 of the motor driving control device 1.

Figure 3:
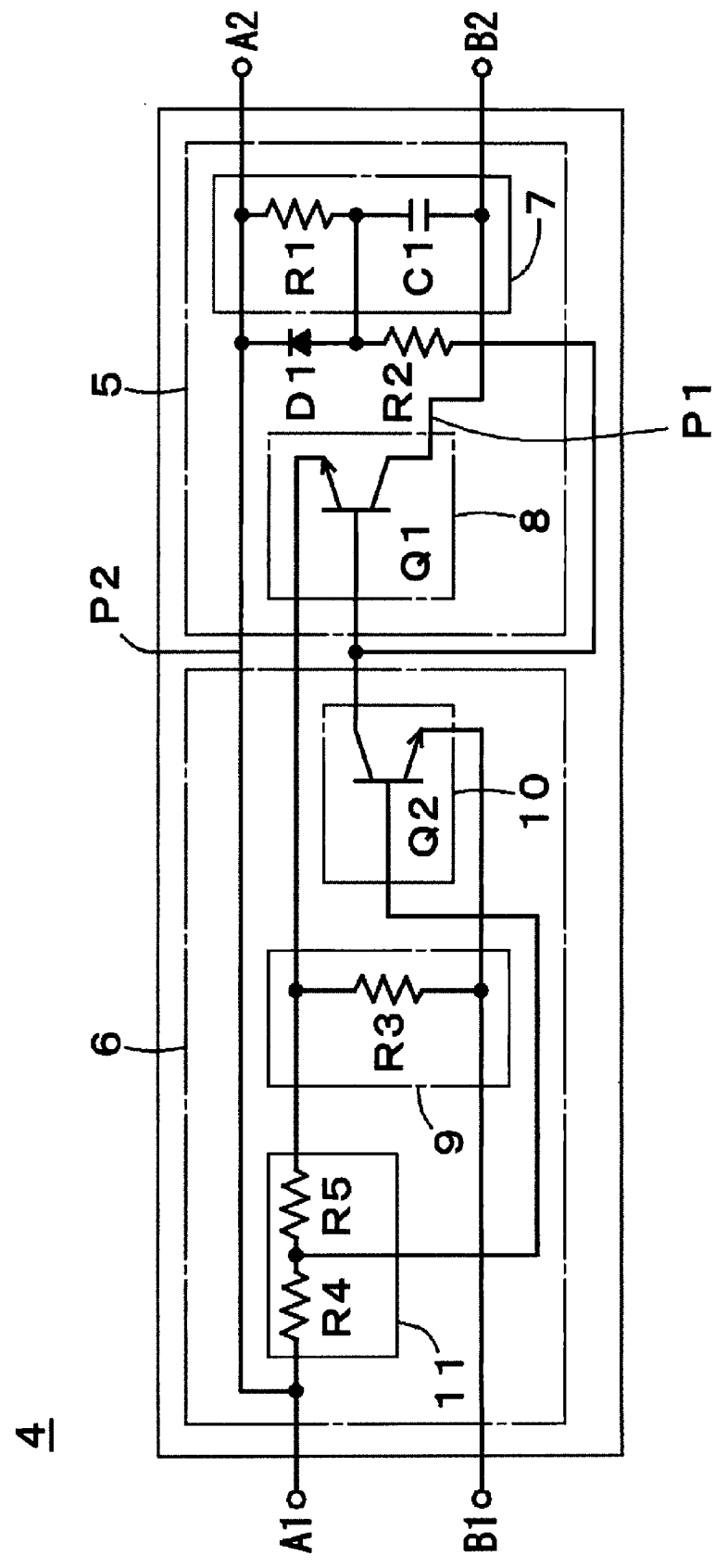
FIG. 3 illustrates a specific example of the circuit configuration of the start-up auxiliary circuit.

As shown in FIG. 2, the start-up auxiliary circuit 4 has a start-up delay circuit 5 and a current limiting circuit 6. The start-up delay circuit 5 and the current limiting circuit 6 are connected to each other. The current limiting circuit 6 is connected to the points A1, B1. The start-up delay circuit 5 is connected to the points A2, B2. Additionally, in FIG. 2, parts (specifically, a reset circuit and a damper circuit) of the elements included in the start-up delay circuit 5 are not shown. The corresponding parts are shown in FIG. 3 and will be specifically described below.

The start-up delay circuit 5 has a delay time setting circuit 7 and a switch circuit 8.

The delay time setting circuit 7 is to set the predetermined delay time period relating to the delay operation. The delay time setting circuit 7 is connected to the point A1, i.e., the output line of the AC/DC converter 2 and to the switch circuit 8. Also, the delay time setting circuit 7 is connected to the points A2, B2.

The switch circuit 8 is turned on after the delay time period set by the delay time setting circuit 7 elapses. When the switch circuit 8 is turned on, the direct current power is supplied from the AC/DC converter 2 to the motor driving unit 3.

The current limiting circuit 6 has a current detection circuit 9, an over-current feedback circuit (over-current F/B circuit) 10 and a voltage level adjusting circuit 11.

The current detection circuit 9 detects a current value of the direct current power that is output from the AC/DC converter 2. The current detection circuit 9 is connected to the point B1. Also, the current detection circuit 9 is connected to the point A1 via the voltage level adjusting circuit 11. An output-side terminal of the current detection circuit 9 is connected to the switch circuit 8.

The over-current feedback circuit 10 controls the on-operation of the switch circuit 8 in response to the current value of the direct current power detected by the current detection circuit 9. The over-current feedback circuit 10 is connected to the point A1 via the voltage level adjusting circuit 11. Also, the over-current feedback circuit 10 is connected to the point B1 via the current detection circuit 9. An output-side terminal of the over-current feedback circuit 10 is input to the switch circuit 8. The switch circuit 8 is turned on or off according to the voltage input from the over-current feedback circuit 10, for example.

The voltage level adjusting circuit 11 adjusts a voltage level of the direct current voltage that is supplied to the over-current feedback circuit 10, according to the current value of the direct current power that is output from the AC/DC converter 2. The voltage level adjusting circuit 11 is connected to the point A1. The voltage level adjusting circuit 11 is connected to each of the current detection circuit 9 and the over-current feedback circuit 10.

When the current value of the direct current power that is output from the AC/DC converter 2 is small, it is necessary to increase the voltage level that is supplied to the over-current feedback circuit 10. The voltage level adjusting circuit 11 becomes a specifically efficient circuit at the corresponding operation condition.

[Specific Example of Circuit Configuration of Start-Up Auxiliary Circuit 4]

FIG. 3 illustrates a specific example of the circuit configuration of the start-up auxiliary circuit 4.

As shown in FIG. 3, in this illustrative embodiment, each circuit of the start-up auxiliary circuit 4 is configured by following circuit elements, for example.

In the start-up delay circuit 5, the delay time setting circuit 7 has a resistance element R1 and a capacitor C1. The resistance element R1 and the capacitor C1 are connected in series. One end of the resistance element R1 is connected to the point A2 and one end of the capacitor C1 is connected to the point B2. Meanwhile, in this illustrative embodiment, the point A2 is connected to the point A1 (in other words, the point A1 is branched and connected to the voltage level adjusting circuit 11 and the point A2).

The switch circuit 8 has a switch element Q1. The switch element Q1 is a bipolar transistor, for example. A collector terminal of the switch element Q1 is connected to the point B2, and an emitter terminal thereof is connected to the current detection circuit 9.

In this illustrative embodiment, the start-up delay circuit 5 further has a diode D1 (which is an example of the reset circuit) and a resistance element R2 (which is an example of the damper circuit). A cathode of the diode D1 is connected to the point A2. An anode of the diode D1 is connected to a connection point of the resistance element R1 and the capacitor C1 and to one end of the resistance element R2. The other end of the resistance element R2 is connected to a base terminal of the switch element Q1.

Additionally, the diode D1 and the resistance element R2 may not be necessarily provided.

In the current limiting circuit 6, the current detection circuit 9 has a resistance element R3. One end of the resistance element R3 is connected to a line connecting the emitter terminal of the switch element Q1 and the voltage level adjusting circuit 11. The other end of the resistance element R3 is connected to a line connecting the point B1 and the over-current feedback circuit 10.

The over-current feedback circuit 10 has a switch element Q2. The switch element Q2 is a bipolar transistor, for example. A collector terminal of the switch element Q2 is connected to the resistance element R2 and the base terminal of the switch element Q1. An emitter terminal of the switch element Q2 is connected to the point B1. A base terminal of the switch element Q2 is connected to the voltage level adjusting circuit 11.

The voltage level adjusting circuit 11 has resistance elements R4 and R5. The resistance element R4 and the resistance element R5 are connected in series, the resistance element R4 is connected to the point A1, and the resistance element R5 is connected to the resistance element R3 and the emitter terminal of the switch element Q1. The base terminal of the switch element Q2 is connected to a connection point of the resistance element R4 and the resistance element R5.

[Operations]

Figure 4:
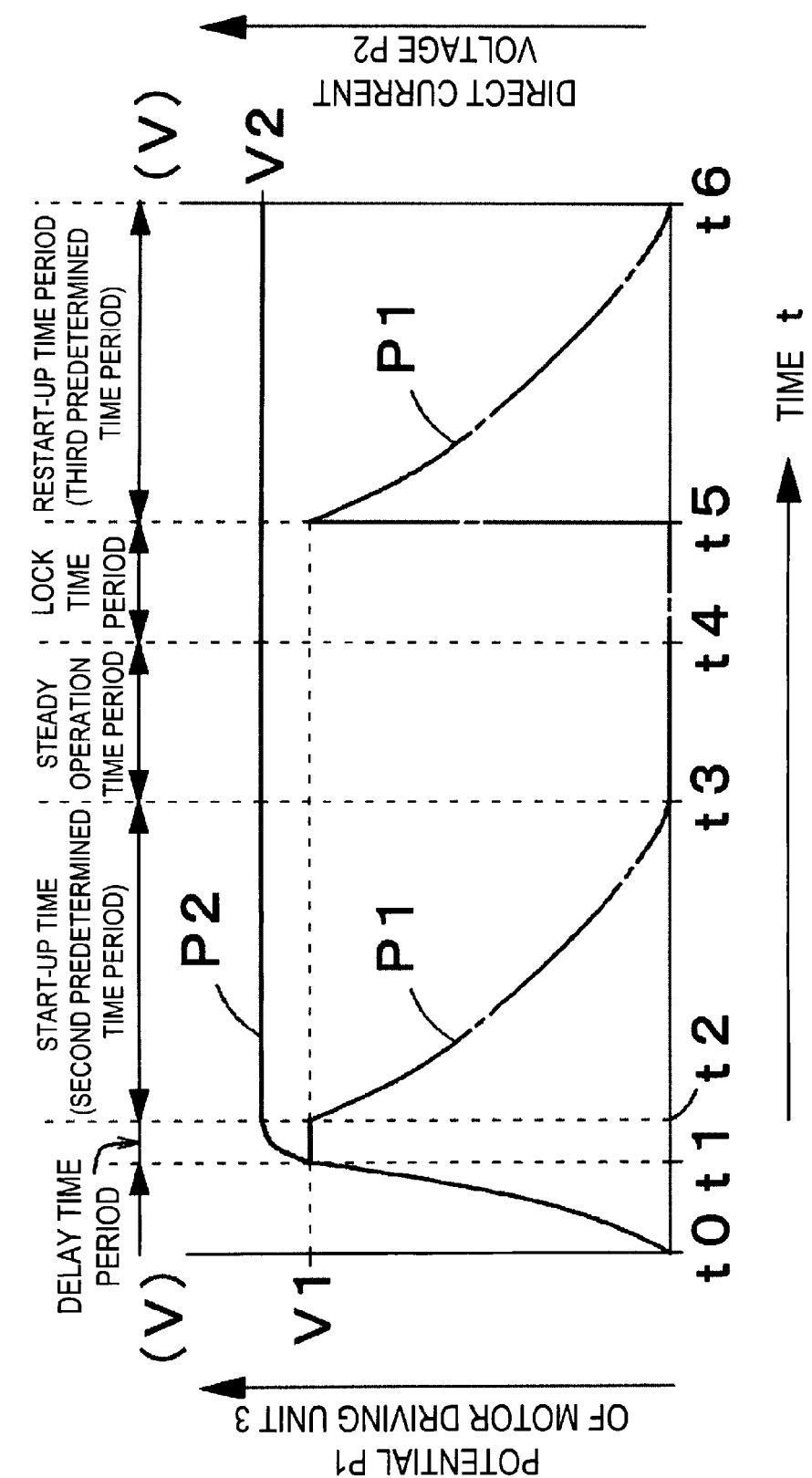
FIG. 4 illustrates a relation between a potential and a direct current voltage of a start-up delay circuit during an operation of the motor driving control device.

FIG. 4 illustrates a relation between a potential P1 and a direct current voltage P2 of the start-up delay circuit 5 during an operation of the motor driving control device 1.

With reference to FIG. 4, an operation of the start-up auxiliary circuit 4 in the start-up of the motor 20 and an operation of the start-up auxiliary circuit 4 in a restart-up from a lock state will be described.

In FIG. 4, the dashed-dotted line indicates a low pressure-side (GND-side) potential P1 of the motor driving unit 3. The potential P1 is a potential of the collector terminal of the switch element Q1, i.e., a potential of the point B2. Also, the solid line indicates a direct current voltage P2 that is output from the AC/DC converter 2. The direct current voltage P2 is a potential difference (which is the same as the potential of the point A1) between the point A1 and the point B1 and is a potential of the point A2. Also, a potential difference between the direct current voltage P2 and the potential P1 is to be a direct current voltage that is input to the motor driving unit 3.

[Delay Operation in Start-Up]

The delay operation is performed for the motor driving unit 3 for a predetermined delay time period after the motor 20 starts up, i.e., the driving control device 1 starts up.

At time t0, when the supply of the alternating current power from the alternating current power supply Vac starts, the AC/DC converter 2 starts up. Thereby, the potential P1 and the direct current voltage P2 increase and become V1(V) at time t1.

At this time, the delay time setting circuit 7 accumulates electric energy, so that the operation of the motor driving unit 3 is delayed. That is, when the AC/DC converter 2 starts up, the capacitor C1 is charged via the resistance element R1 in the delay time setting circuit 7. At time t2, when the potential of the capacitor C1 is increased to a predetermined potential, the charges are supplied to the switch element Q1 via the resistance element R2. When a voltage of the base terminal of the switch element Q1 is increased and the switch element Q1 is thus activated, the motor driving unit 3 starts the operation thereof.

The time period during which the capacitor C1 is charged up to a predetermined potential is a delay time period (=time period in which delay time is set). In FIG. 4, the delay time period is from time t1 to time t2. During the delay time period, the potential P1 is kept at V1(V). In the meantime, the direct current voltage P2 gradually increases and becomes a potential V2(V) of a steady state at time t2.

Here, the resistance element R2 functions as a damper circuit that limits the current to be supplied to the switch circuit 8. That is, the resistance element R2 gently increases the current flowing in the switch element Q1 and assists a soft switching of the switch element Q1. Additionally, the resistance element Q2 may not be necessarily provided.

Also, the diode D1 functions as a reset circuit that discharges the electric energy accumulated in the delay time setting circuit 7. That is, when the AC/DC converter 2 stops, the diode D1 rapidly discharges the energy accumulated in the capacitor C1 and resets the delay time setting circuit 7. The diode D1 is specifically effective when the alternating current power supply Vac repeats the on and off operations in a short time and can reliably operate the driving control device 1. In the meantime, the diode D1 may not be necessarily provided.

[Current Limiting Operation]

The driving current flowing in the motor 20 is limited for a predetermined start-up time period (second predetermined time period) after the motor driving unit 3 starts the operation thereof (a current limiting operation in the start-up).

In the current limiting circuit 6, a voltage detected by using the resistance element R3 of the current detection circuit 9 from the voltage of the point A1 is divided at the resistance elements R4 and R5 of the voltage level adjusting circuit 11 and then applied to the base terminal of the switch element Q2. Then, when the potential of the base terminal of the switch element Q2 reaches a predetermined voltage, the switch element Q2 is turned on. Thereby, the current of the switch element Q1 is limited for a start-up time period from time t2 to time t3.

That is, the switch element Q2, as an over-current limiting element, limits the switch element Q1 until the rotation of the motor 20 increases and reaches a rated load (steady operation). Specifically, as shown in FIG. 4, the potential P1 gradually decreases from the potential V1(V) at time t2 and becomes zero (0) at time t3. In the meantime, the direct current voltage P2 is kept at V2(V). A difference voltage (P2−P1) (V) between the direct current voltage P2 and the potential P1 is a driving voltage that is supplied to the motor driving unit 3 so as to drive the motor 20. That is, the current limit with respect to P1(V) is performed for the driving voltage. The current limit is made so that the current flowing in the motor driving unit 3 becomes a predetermined value or smaller so as not to exceed the rating.

When the potential P1 becomes zero (0) at time t3, a time period after time t3 becomes a steady operation time period during which the direct current voltage P2 is applied as the driving voltage.

[Current Limiting Operation in Restart-Up]

Here, a case where a rotor of the motor 20 is locked due to any factor is assumed. In this illustrative embodiment, even when the restart-up is performed after the lock state is made, the current limiting operation is performed, similarly to the start-up. The current limiting operation in the restart-up is performed for a predetermined a restart-up time period (third predetermined time period) after the restart-up starts.

For example, as shown in FIG. 4, after the steady operation time period from time t3 to time t4, a lock time period from time t4 to time t5 elapses and then the restart-up starts from time t5. At this time, the potential P1 increases to V1(V) just after time t5, then gradually decreases and becomes zero (0) at time t6, like the start-up. Like this, during the restart-up time period from time t5 to time t6, the current limit of P1(V) is performed for the driving voltage, similarly to the start-up. In the meantime, it cannot be said that a span of the restart-up time period is the same as the start-up time period because the span is determined according to the load state and the like of the motor 20.

Effects of Illustrative Embodiment

According to the driving control device 1 configured as described above, it is possible to delay the operation of the motor driving unit 3 by the operations of the start-up auxiliary circuit 4 after the supply of the alternating current power from the alternating current power supply Vac to the AC/DC converter 2 starts until the delay time period (first predetermined time period) elapses. That is, it is possible to delay the output of the driving signal of the motor driving unit 3 for the delay time period. Thereby, it is possible to prevent the motor 20 from starting simultaneously with the supply of the alternating current power from the alternating current power supply Vac.

Also, the driving current flowing in the motor 20 is limited by the operations of the start-up auxiliary circuit 4 after the motor driving unit 3 starts the operation thereof until the start-up time period (second predetermined time period) elapses and after the lock state is released and the restart-up starts until the restart-up time period (third predetermined time period) elapses. Thereby, it is possible to prevent the rated driving current or larger from flowing in the start-up of the motor 20.

As described above, since it is possible to prevent the motor 20 from starting simultaneously with the supply of the alternating current power and to prevent the rated driving current or larger from flowing, it is possible to stabilize the operation of the AC/DC converter 2. Since it is possible to configure the start-up auxiliary circuit 4 by using only the simple circuit elements, it is possible to reduce the manufacturing cost.

Meanwhile, in this illustrative embodiment, it is possible to set a large potential difference between the collector and emitter terminals of the switch element Q1. Thereby, it is possible to prevent the direct current power from the AC/DC converter 2 from being instantaneously interrupted when the alternating current power supply Vac is on or in the restart-up after the lock state is released.

[Others]

Additionally, the voltage level adjusting circuit may not be provided to the current limiting circuit of the start-up auxiliary circuit. For example, when the current value of the direct current power is large that is output from the AC/DC converter 2, in FIG. 3, the voltage level adjusting circuit may not provided, the current detection circuit 9 and the over-current feedback circuit 10 may not be connected to the point A1 and then one end (side connected to the emitter terminal of the switch element Q1) of the resistance element R3 of the current detection circuit 9 and the base terminal of the switch element Q2 of the over-current feedback circuit 10 may be connected to each other via a resistance element.

The target driven by the motor driving control device is not limited to the DC brushless motor, and the other motors may be also possible.

The configuration of the circuit elements configuring the start-up delay circuit and the current limiting circuit is not limited to that shown in FIG. 3. For example, the switch elements Q1, Q2 in FIG. 3 are not limited to the bipolar transistors and an FET (Field Effect Transistor), an IGBT (Insulated Gate Bipolar Transistor) and the like are also possible.

The switch circuit may be provided with a mechanical part such as mechanical relay, instead of the switch elements using the semiconductors.

It should be noted that the above illustrative embodiment is just exemplary and is not limitative. The scope of this disclosure is not only defined in the above descriptions and is intended to include the equivalent meanings and all modifications.

What is claimed is:

1. A motor driving device comprising:
    an AC/DC converter that converts alternating current power, which is supplied from an alternating current power supply, into direct current power;
    a motor driving unit that operates based on the direct current power supplied from the AC/DC converter and outputs a driving signal to a motor; and
    a start-up auxiliary circuit that is arranged on a path connecting the AC/DC converter and the motor driving unit,
        wherein the start-up auxiliary circuit:
    delays an output of the driving signal from the motor driving unit for a first predetermined time period after the supply of the alternating current power from the alternating current power supply to the AC/DC converter starts; and gradually increases a driving voltage of the motor driving unit so that current flowing in a driving coil of the motor is limited to a predetermined value or smaller for a second predetermined time period after the output of the driving signal from the motor driving unit starts; and wherein the start-up auxiliary circuit comprises:

a start-up delay circuit that delays the output of the driving signal from the motor driving unit for the first predetermined time period; and a current limiting circuit that limits the current flowing in the driving coil of the motor for the second predetermined time period, wherein the start-up delay circuit comprises:

a delay time setting circuit that sets the first predetermined time period; and a switch circuit that sets the direct current power to be supplied from the AC/DC converter to the motor driving unit after the first predetermined time period set by the delay time setting circuit elapses, and wherein the current limiting circuit comprises:

a current detection circuit that detects a current value of the direct current power;

and an over-current feedback circuit that controls an operation of the switch circuit in response to the current value detected by the current detection circuit.

2. The motor driving control device according to claim 1, wherein the start-up delay circuit further comprises at least one of:

a reset circuit that discharges electric energy accumulated in the delay time setting circuit; and a damper circuit that limits current flowing in the switch circuit.

3. The motor driving control device according to claim 1, wherein the current limiting circuit further comprises a voltage level adjusting circuit that adjusts a voltage level of a direct current voltage to be supplied to the over-current feedback circuit, in response to a current value of the direct current power.

4. The motor driving control device according to claim 1, wherein, in a restart-up after a rotor of the motor is locked, the start-up auxiliary circuit gradually increases the driving voltage of the motor driving unit so that the current flowing in the driving coil of the motor is limited to a predetermined value or smaller for a third predetermined time period after the output of the driving signal from the motor driving unit starts until the motor reaches a steady rotation.

5. The motor driving control device according to claim 1, wherein the second predetermined time period is a time period after the output of the driving signal from the motor driving unit starts until the motor reaches a steady rotation.

6. A start-up auxiliary circuit comprising:

a start-up delay circuit that delays an output of a received driving signal for a first predetermined time period; and a current limiting circuit that limits a current to be supplied to a drive target for a second predetermined time period, wherein the start-up delay circuit comprises:

a delay time setting circuit that sets the first predetermined time period; and a switch circuit that sets a direct current power to be supplied to the drive target after the first predetermined time period set by the delay time setting circuit elapses, and wherein the current limiting circuit comprises:

a current detection circuit that detects a current value of the direct current power; and an over-current feedback circuit that controls an operation of the switch circuit in response to the current value detected by the current detection circuit.

* * * * *